United States Patent [19]

Lewis et al.

[11] 3,716,508

[45] Feb. 13, 1973

[54] AIR-DRIED COATINGS COMPOSITIONS COMPRISING POLYESTER RESINS AND A SATURATED ALIPHATIC ALDEHYDE

[75] Inventors: Sheldon N. Lewis, Willow Grove; George A. Frank, Fort Washington, both of Pa.

[73] Assignee: Rohm and Haas Company, Philadelphia, Pa.

[22] Filed: July 9, 1971

[21] Appl. No.: 161,317

[52] U.S. Cl............260/22 A, 117/124 E, 117/132 B, 117/161 K, 260/28, 260/32.8 R, 260/33.6 R
[51] Int. Cl..........................C09d 3/64, C09d 3/66
[58] Field of Search............260/22 CA, 22 A, 32.8 R

[56] References Cited

UNITED STATES PATENTS

| 3,002,945 | 10/1961 | Rolle et al.......................260/32.8 R |
| 3,639,321 | 2/1972 | Fuhr et al............................260/28.5 |
| 3,396,128 | 8/1968 | Matumoto et al......................260/22 |
| 2,809,185 | 10/1957 | Hearne et al..........................260/67 |

FOREIGN PATENTS OR APPLICATIONS

| 944,629 | 12/1963 | Great Britain...................260/32.8 R |

Primary Examiner—Donald E. Czaja
Assistant Examiner—Ronald W. Griffin
Attorney—George Simmons et al.

[57] ABSTRACT

In accordance with the invention, new air-drying compositions for coating, impregnating, etc. have been discovered which are based on the reaction of fumaric esters with mono-, di- or polyaldehydes. The reaction involved is fast and cures rapidly with complete consumption of at least one of the reactants so that coatings and the like made from these compositions set quickly to a hard condition and do not overcure to an embrittled condition on ageing.

10 Claims, No Drawings

AIR-DRIED COATINGS COMPOSITIONS COMPRISING POLYESTER RESINS AND A SATURATED ALIPHATIC ALDEHYDE

DESCRIPTION OF THE INVENTION

Drying oils and oil-modified alkyd resins have been widely used for making air-drying paints.

The design of shelf-stable vehicles which cure to resistant coatings at ambient temperatures on exposure to atmospheric oxygen has received considerable industrial attention. In contrast to the number and chemical diversity of thermally-cured industrial coatings which have achieved commercialization, however, few improvements on the historic unsaturated oil-modified alkyd enamels have evolved. This is in part a reflection of the nature of an oxygen-supported reaction. Whereas thermosetting enamels are characterized by ionic reaction processes, oxygen-initiated cure is usually the result of slow, extremely inefficient free-radical reactions. To compensate for this inefficiency, the system is loaded with an excess of oxidatively susceptible functionality (in most cases a polyunsaturated fatty acid derivative) which crosslinks via dimerization or olefin addition of the alkyl and peroxidic radical intermediates. This mass action influence on the kinetics is usually self-defeating, however. Although it permits the development of the desired surface properties in an arbitrarily defined length of time, the reaction often continues long beyond intent and eventually results in embrittlement or "overcure" of the coating.

Novel room temperature coating compositions have now been discovered which rapidly cure with complete consumption of at least one of the reactants. This provides for the development of predetermined levels of crosslinking and thereby controls the ultimate degree of cure and prevents embrittlement as a result of overcure on prolonged ageing.

In accordance with the present invention, a composition is prepared comprising a polyester obtained from an unsaturated dicarboxylic acid such as fumaric or maleic acid, an aldehyde, preferably an aliphatic aldehyde, such as octanal or glutaraldehyde, and either an ultraviolet sensitizer or a transition metal salt drier.

The polyester is preferably one that is liquid at normal room temperature having a molecular weight of 500 to 10,000. However, polyesters having somewhat higher molecular weight up to 12,000 can be used. If the polyester in this latter instance lacks the mobility of a liquid, it may be dissolved in a suitable volatile solvent to aid in applying the composition as a coating. The polyester may have any one of a wide variety of chemical constitutions provided that at least about 20 mole percent of the dicarboxylic acid component from which it is made is maleic acid or preferably fumaric acid. If desired, the entire dicarboxylic acid component of the polyester condensate may be maleic or preferably fumaric acid. However, the dicarboxylic acid component may contain up to 80 mol percent of acids other than these unsaturated acids. Examples of other diacids that may constitute up to 80 mol percent of the diacid component of the polyester include o-phthalic, isophthalic, terephthalic, succinic, adipic, sebacic, azaleic, glutaric, itaconic and citraconic acids. Thus, the dicarboxylic component may comprise 20 to 100 mol percent, preferably 50 to 70 mol percent of fumaric acid and the balance of maleic, phthalic, or succinic acids.

As is well known, in the making of polyesters, the dicarboxylic acid may be used as the acid itself, an anhydride thereof, or a mono- or di-ester thereof, such as the dimethyl ester. In the present description in the specification or in the definition in the claims, reference to a diacid is intended to embrace the diacid, the anhydride or ester regardless of which is used as the source of the diacid in the making of the polyester.

The polyesters used in the present invention are preferably of linear character in that they result from the condensation of a diacid and a diol, such as a glycol. However, polyesters obtained from reactants containing a relatively small proportion of polyacids having more than two carboxylic acid groups and/or of polyols having more than two hydroxyl groups may be used as long as the polyesters are of sufficiently low molecular weight to be mobile liquids at normal room temperatures.

Examples of diols include ethylene glycol, propylene glycol, butylene glycol, hexamethylene glycol, diethylene glycol, dipropylene glycol, 2-ethyl-2-methyl-1,3-propane-diol, and neopentyl glycol. Polyols having more than two hydroxyl groups include glycerol, trimethylol-ethane, trimethylol-propane, sorbitol, and mannitol. Examples of polyacids having more than two carboxyl groups include trimellitic acid, citric, and tricarballylic. The amount of polyols or polyacids having a functionality of more than two may be up to 10 mol percent of the total diol or diacid respectively that is used.

The aldehydes that may be used are glutaraldehyde, butyraldehyde, octanal, hydroxypivaldehyde, and esters of the latter, e.g. acetate, propionate, hexanoate, and succinate, citronellal, 3,7-dimethyl-7-hydroxy-octanal, and esters thereof, such as the acetate or propionate, $\beta$-methoxypropionaldehyde, $\beta$-ethoxypropionaldehyde.

The proportion of aldehyde charged is an amount that is approximately stoichiometrically equivalent (or less) to the unsaturated diacid component in the polyester of the composition.

For normal coating purposes, the coating composition contains a metal salt drier of conventional type. These are salts of bivalent or tetravalent metals including the transition metals, such as cobalt, nickel, copper, chromium, cadmium, zinc, tin, vanadium, zirconium, lead, calcium, barium, magnesium, and manganese. Specific examples include cobalt naphthenate, cobalt octoate, zirconium naphthenate, and zirconium octoate. The acid may be naphthenic acid or any higher aliphatic acid having from six to 18 or more carbon atoms, such as hexoic, octoic, 2-ethylhexoic, decylenic, oleic, palmitic, ricinoleic, stearic and resinic. These metals may also be used as the salts of such acids as maleic, salicylate, and phthalic. Similarly, the basic carbonates and phosphites of these metals may be used.

The proportion of metal salt drier may be from 0.1 to 1.5 mol percent, based on the amount of aldehyde functionality in the composition. Preferably, 0.2 to 1 mol percent is used.

It appears that the curing of this system with a metal salt drier is dependent on exposure to the oxygen of the atmosphere, as when spread in the form of a protective coating film. The reaction is rapid and completely consumes the aldehyde most importantly by free radical reaction with the polyester double bonds. Complete consumption of the aldehyde assures that the reaction stops, thereby preventing prolonged reactions, typical of conventional air-drying systems. The reaction, using a monoaldehyde RCHO, a cobalt drier, and a fumaric acid-containing polyester may be diagrammatically illustrated by the following sequential stages:

$$RCH{\overset{O}{\|}} \xrightarrow{Co^{II}/O_2} R-{\overset{O}{\overset{\|}{C}}}\cdot$$

$$R{\overset{O}{\overset{\|}{C}}}\cdot + RO-{\overset{O}{\overset{\|}{C}}}-{\overset{H}{\overset{|}{C}}}={\overset{H}{\overset{|}{C}}}-{\overset{O}{\overset{\|}{C}}}OR \longrightarrow RO-{\overset{O}{\overset{\|}{C}}}-CH-{\overset{|}{C}}-HCOOR \atop {\overset{|}{\underset{R}{C=O}}}$$

The latter schematically represents a free radical derived from the polyester which adds on to another molecule of the unsaturated ester etc. to produce a polymer. When a dialdehyde such as glutaraldehyde is used, the reaction may be represented by the following equations:

$$O={\overset{H}{\overset{|}{C}}}-(CH_2)_3-{\overset{H}{\overset{|}{C}}}=O \xrightarrow{Co^{II}/O_2} O=C-(CH_2)_3-{\overset{H}{\overset{|}{C}}}=O$$
(dialdehyde) (free radical)

$$O=C-(CH_2)_3-{\overset{H}{\overset{|}{C}}}=O + RO-{\overset{O}{\overset{\|}{C}}}-{\overset{H}{\overset{|}{C}}}={\overset{H}{\overset{|}{C}}}-{\overset{O}{\overset{\|}{C}}}OR \longrightarrow$$
(polyester)

$$RO-{\overset{O}{\overset{\|}{C}}}-{\overset{H}{\overset{|}{C}}}-{\overset{H}{\overset{|}{C}}}-{\overset{O}{\overset{\|}{C}}}OR \atop {\overset{|}{C=O}} \atop {\overset{|}{(CH_2)_3}} \atop {\overset{|}{CH}} \atop {\overset{\|}{O}}$$

The latter may react in one or more ways. For example, it may react with more polyester (as above-free radical on unsaturated bond) and so on to build up the polymer molecule. Alternately, it may chain transfer with its own pendant aldehyde group to provide a new acyl radical which may then add to another molecule of the unsaturated polyester to provide polymers with a different structural relationship. It is to be understood that the present invention is not to be limited to this theory of operation.

Since the aldehyde is completely consumed, any unsaturation remaining, if any, is not susceptible to further reaction on ageing. Thus, the cured product is not susceptible to ageing in such a way as to overcure and embrittle the film. Storage of the system in a container which excludes oxygen provides good shelf stability.

When the system is used in conjunction with ultraviolet light, a light sensitizer may be used instead of, or in addition to, the metal salt drier for the purpose of developing free radicals from the aldehyde. Typical classes of such sensitizers include:

A. Vicinal polyketaldonyl compounds, such as:
a. Vicinal polyketaldo-carbonyl compounds of the formula $R(CO)_nR'$, $n$ being 2 or greater and R and R' being the same or different and being aliphatic or aromatic radicals, preferably hydrocarbon, whose free valence stems from carbon. By "ketaldonyl" is meant compounds containing ketone or aldehyde group. By "ketaldo-carbonyl" is meant the CO group in an aldehyde or ketone as distinguished from the CO group of an acid. Examples include:
diacetyl
pentanedione 2,3
octanedione 2,3
phenyl glyoxal
1-phenyl butane-dione-1,2 ($C_6H_5COCOCH_2CH_3$)
benzil
2,2-dimethyl-4-phenylbutanedione-3,4
glyoxal
phenylglyoxal
diphenyl triketone
1,2-cyclohexanedione b. Alpha-ketaldonyl alcohols of the formula RCOCHOHR' where R and R' are the same or different and may be hydrogen atoms, aliphatic or aromatic radicals, preferably hydrocarbon, whose free valences stem from carbon, such as the following acyloins:
benzoin
3-hydroxy-4-methylpentanone-2
butyroin
tert-butylbenzoin
toluoin
tert-butyltoluoin
11-hydroxy-12-ketotetracosane
glycolic aldehyde
acetoin
alpha-methylbenzoin
acetoin
butyroin
tert-butylbenzoin
p-tert-butyltoluin, and
acryloins of the formula $$Ar-{\overset{R}{\overset{|}{C}}}-{\overset{O}{\overset{\|}{C}}}-Ar \atop {\overset{|}{OH}}$$

wherein R is a monovalent hydrocarbon radical having one to nine carbon atoms, and Ar is a monovalent monocyclic aromatic hydrocarbon radical, are of generic applicability. Such acyloins in which R in the above formula is an aliphatic hydrocarbon radical of one to four carbons and in which Ar is phenyl are especially suitable. Other α-substitute acyloins which can be employed include α-ethylbenzoin, α-propylbenzoin, α-methyltoluin, α-(n-nonyl)benzoin.

c. An acyloin ether of the formula $$R-CH-{\overset{O}{\overset{\|}{C}}}-R' \atop {\overset{|}{O-R''}}$$

wherein R, R' and R'' are monovalent hydrocarbon radicals. Examples include:
benzoin methyl ether
benzoin ethyl ether
benzoin propyl ether
pivaloin methyl ether
anisoin methyl ether B. Halogen-containing compounds of groups A, B, C, D, and E of U.S. Pat. No. 2,548,685. Examples include:
alpha-chlormethylnaphthalene
phenacyl bromide
β-toluenesulfonyl chloride chloroacetone
chloral hydrate
sulfuryl chloride
acetyl chloride
allyl chloroformate
chloroacetyl chloride C. Haloalkyl-substituted polynuclear aryl hydrocarbons of condensed benzene ring type, such as:
α-chlormethyl naphthalene
β-chlormethyl naphthalene
chlormethyl phenanthrenes, such as
gamma-chlormethyl phenanthrene,
1,4-dichlormethyl naphthalene,
1,5-dichlormethyl naphthalene,
or the 9,10-dichlormethyl anthracene
β-substituted analogues, for example
2,3-dichlormethyl naphthalene or
2,3-dichlormethyl anthracene
2,6-dichlormethyl naphthalene The amount of ultraviolet sensitizer in the composition may be from 0.001 to 10 percent by weight of the polyester. Compositions of this type may be used as photographic pictures. For this purpose, the film may also contain coloring agents, such as dyes or pigments, and after selective exposure to an image-forming light source, such as the lens of a camera or a negative transparency, the unexposed portions are dissolved and removed leaving the exposed portions to show the image.

If desired, the compositions may comprise both a metal salt drier and an ultraviolet light sensitizer. All three types of composition (that containing the ultraviolet sensitizer, and that containing both) are useful for the impregnation and/or coating of all sorts of substrates, both porous and non-porous, and flexible or rigid. Thus, they may be used for the impregnation of paper, textiles, and leather as in the stabilization of wool fabrics, the crease-proofing of cotton, the strengthening (dry and/or wet) of paper, the reduction of the break in leather. The compositions may also be used for coating such substrates and others. Thus, they can be used for imparting to textiles, leather, and paper a finish that is water-repellent and durable. The compositions can be used in clear or pigmented form to paint or lacquer decoratively all sorts of substrates, such as wood; plastic; plasterboard; plastics including films and formed articles of polyethylene, polyesters, especially polyethylene glycol terephthalate, polyamides, such as nylon, cellophane, cellulose acetate butyrate, polystyrene, polymethyl methacrylate, polyvinyl chloride, polyvinylidene chloride, copolymers or vinyl chloride or of vinylidene chloride with vinyl acetate, ethyl acrylate, methyl methacrylate and/or styrene; metals, such as automobile bodies or parts formed of iron, steel, aluminum, copper, or any of their alloys; masonry of all types, such as concrete, cement, bricks, stones, asbestos-cement shingles and/or siding, slate, and sandstone; ceramic articles, such as ceramic tile glazed or unglazed, porcelain; glass; linoleum; and so on. They may also be used as adhesives to join laminae of any of the materials mentioned.

The compositions are generally sufficiently fluid to be applied without dilution. However, they may be dissolved in an organic solvent, such as methyl ethyl ketone, methyl isopropyl ketone, acetone, dioxane, ethyl acetate, amyl acetate, butyl acetate, ethyl butyl ether, butoxyethyl acetate, mixtures thereof, or mixtures of one or more of these solvents with toluene, xylene, 1,2-dichloroethane, carbon tetrachloride or the like. The concentration therefore may vary from 1 to 100 percent by weight of the film-forming composition consisting of (a) polyester, (b) aldehyde and (c) metal salt drier or ultraviolet sensitizer, depending on the purpose for which the composition is to be used. For impregnations, as low as 1 to 10 percent concentrations may be most desirable whereas for coating purposes, concentrations of 5 to 100 percent are generally more suitable.

The compositions may be clear or they may be colored with a dye or pigment. A filler may also be used. The amount of dye may be from 0.1 to 1 percent by weight of the polyester in the composition whereas the amount of pigment may range from about 1 to 100 percent, preferably 5 to 50 percent by weight of the polyester in the composition.

The compositions may be applied in any conventional fashion, as by brushing, spraying, dipping, or by transfer rolls, and the thickness may be controlled by the use of a squeegee or a "doctor" knife. Thickening agents, such as cellulose ethers or esters, may be incorporated to adapt the composition to a particular coating system. The application may be performed at room temperature or higher.

After application of the coating, it may be dried simply by exposure to the ambient atmosphere at normal room temperature or higher or lower outdoor temperatures. In the case of the compositions containing the ultraviolet sensitizers, the drying should be effected while being exposed to ultraviolet light, either of the sun or from an artificial source. Generally, the coatings become dry to the touch within a period of 1 to 4 hours. In the case of the compositions containing ultraviolet sensitizers, the hardening occurs in a period of a few minutes, e.g. 1 to 5 minutes, when the intensity of the ultraviolet light is at least that equivalent to that of a bright sunny day.

To assist those skilled in the art to practice the present invention, the following modes of operation are suggested by way of illustration, parts and percentages being by weight and the temperature in ° C. unless otherwise specifically noted.

EXAMPLE 1

To a mixture of 44.4 g. of a poly(2-ethyl-2-methyl-1,3-propanediol fumarate), 0.393 g. of cobalt naphthenate (6% Co) and 29.2 g. of toluene, there is added 8.94 g. of n-octanal. The homogeneous blend, when spread in thin films on glass and exposed to ambient air, dries to a clear, hard, insoluble film in less than 24 hours.

EXAMPLE 2

A mixture of 35.6 g. of a 60 percent solution of poly(dipropyleneglycol fumarate) in toluene, 16.7 g. of a 30 percent solution of glutaraldehyde in toluene, and 0.50 g. of cobalt naphthenate (6% Co) is spread in thin films (2 to 10 mil) on panels of wood, steel, aluminum, brass, and copper. Within 24 hours on exposure to ambient air, the material dries to a hard, clear, insoluble film.

EXAMPLE 3

A mixture of 165.0 g. of a 60 percent solution of poly-(2-ethyl-2-methyl-1,3-propanediol fumarate) in toluene, 17.2 g. of 3,7-dimethyl-7-hydroxyoctanal, and 0.50 g. of cobalt naphthenate (6% Co), dries to hard, clear, insoluble films in less than 24 hours, when spread at a thickness of 2 to 10 mils and exposed to ambient air.

EXAMPLE 4 a. A mixture of 29.9 g. of a poly(2-ethyl-2-methyl-1,3-propanediol fumarate), 0.362 g. of cobalt naphthenate (6% Co) and 37.8 g. of toluene is mixed with 13.1 g. of hexanoyloxypivaldehyde prepared as described in part (b) hereof. The homogeneous blend, when spread in thin films on glass and exposed to ambient air, dries to a clear hard film which is insoluble in water, toluene, and methyl isobutyl ketone, in less than 24 hours.

b. A mixture of 81.6 g. hydroxypivaldehyde dimer (0.800 mole hydroxypivaldehyde) and 350 ml. of benzene is refluxed through a Dean-Stark trap to form hydroxypivaldehyde itself and remove traces of water. Addition of 64.0 g. (0.810 mole) of dry pyridine is followed by dropwise addition of 108 g. (0.800 mole) of hexanoyl chloride in 150 ml. of benzene to the refluxing mixture over a 2 hour period. The mixture is refluxed for 18 hours after which the pyridine hydrochloride is removed by filtration. The filtrate is washed with 5 percent aqueous hydrochloric acid, saturated aqueous sodium bicarbonate, and brine, then dried over magnesium sulfate and evaporated in vacuo leaving 87.0 g. (55 percent yield) of crude hexanoic acid ester of hydroxypivaldehyde; (b. p. range 68°–80° [0.30 mm. Hg]). The ir spectrum contains strong peaks at 2,710 (aldehyde CH stretch), 1,745 (ester C=O stretch), and 1,735 $cm^{-1}$ (aldehyde C=O stretch). No acid or alcohol OH peaks are evident.

EXAMPLE 5 a. A mixture of 66.0 g. of a 60 percent solution of poly-(2-ethyl-2-methyl-1,3-propanediol fumarate) in toluene, 14.3 g. of succinoxydipivaldehyde (see part (b) hereof) and 0.50 g. of cobalt naphthenate (6% Co), dries to hard, clear, insoluble films in less than 24 hours, spread at thicknesses of 2 to 10 mil on asbestos-cement shingles, cinderblock, glassblock, and fired brick and exposed to ambient air.

b. The procedure of Example 4(b) is repeated except the hexanoyl chloride is replaced with 62 g. of succinoyl chloride. The hydroxypivaldehyde diester of succinic acid, having a boiling range of 150°–169° at 0.17 mm. Hg, is obtained in 79 percent yield.

EXAMPLE 6

A syrup composed of 60 g. of poly(2-ethyl-2-methyl-1,3-propanediol fumarate), 40 g. of methyl methacrylate, and 0.3 g. of paraffin wax, is mixed with 12.1 g. of 3,7-dimethyl-7-hydroxyoctanal and then spread in thin films. Exposure of the films to ambient air yield hard, clear, insoluble films within 24 hours which achieve maximum hardness within 8 days.

EXAMPLE 7

A syrup composed of 30 g. of a 40 percent methyl methacrylate/60 percent butyl methacrylate copolymer, 67.9 g. of methyl methacrylate, 2.1 g. of 1,3-butanediol dimethacrylate, and 0.3 g. of paraffin wax, is mixed with 6.02 g. of 3,7-dimethyl-7-hydroxyoctanal and spread in thin films. Exposure of the films to ambient air yield hard clear films within 24 hours which achieve maximum hardness within 8 days.

EXAMPLE 8

A mixture of 35.6 g. of a 60 percent solution of poly-(dipropyleneglycol fumarate) in toluene, 16.7 g. of a 30 percent solution of glutaraldehyde in toluene, and 0.25 g. of benzoin is spread into a 5-mil film on glass, and plastics, particularly phenol/formaldehyde, melamine/formaldehyde, and irradiated for 4 hours with a 275 watt General Electric Sunlamp. A hard, clear, insoluble film is obtained.

EXAMPLE 9

A mixture of 40.0 g. rutile titanium dioxide, 51.0 g. of poly(dipropyleneglycol fumarate), 9.0 g. of glutaraldehyde, 1.0 g. cobalt naphthenate (6% Co), and 40.0 g. of toluene is ground together giving a coating mixture with a 40/60 pigment/binder ratio. This mixture is spread as a thin film on steel plates and is dried to a hard, glossy white coating. A film of 1.6 ml. dry thickness, dried for seven days, gives a Knoop Hardness number of 9.6, a swell ratio of 1.45, and is unaffected by flexing around a ¼ inch mandrel. Baking the film at 350° F. for 16 hours leads to a Knoop Hardness number of 22.8 and only slight stress whitening when flexed around a ¼ inch mandrel. Flexing around a ½ inch mandrel does not affect the film.

EXAMPLE 10

A mixture of 60.0 g. of poly(2-ethyl-2-methyl-1,3-propanediol/maleic anhydride/adipic acid [2/1.5/0.5 molar ratio]) (M. W. about 2,500), 5.5 g. of glutaraldehyde, 0.5 g. of cobalt naphthenate (6% Co), and 44.0 g. of toluene is spread as a thin film on canvas and exposed to air and is dried to a flexible, insoluble coating which renders the canvas impervious to water and organic solvents. Similar behavior is observed on leather and paper.

I claim:

1. An air-drying coating composition comprising (a) a liquid polyester of a dicarboxylic acid having two to 12 carbon atoms and a diol having two to eight carbon atoms, at least 20 mol percent of the dicarboxylic acid being an unsaturated acid selected from maleic and/or fumaric acid (b) a saturated aliphatic aldehyde, the proportion of the aldehyde being an amount that is approximately that which is stoichiometrically equivalent to the unsaturated acid combined in the polyester, and (c) a metal salt drier or an ultraviolet sensitizer, the drier or sensitizer serving in the presence of oxygen to convert the aldehyde to free radical form.

2. A composition in accordance with claim 1 in which the aldehyde is glutaraldehyde.

3. A composition in accordance with claim 1 containing 0.1 to 1.5 mol percent by weight, based on the aldehyde functionality in the composition, of the metal salt drier (c).

4. A composition in accordance with claim 1 containing 0.001 to 10 percent by weight, based on the weight of polyester (a), of the ultraviolet sensitizer.

5. A composition in accordance with claim 1 in which the entire dicarboxylic acid content of the polyester (a) is fumaric acid.

6. A composition in accordance with claim 3 in which the metal salt drier is cobalt octoate.

7. A composition in accordance with claim 3 in which the metal salt drier is cobalt naphthenate.

8. A composition in accordance with claim 4 in which the sensitizer is benzoin.

9. An air-drying coating composition comprising (a) a liquid polyester of a dicarboxylic acid having two to 12 carbon atoms, a diol having two to eight carbon atoms, and zero to 10 mol percent of a polyol or polyacid having a functionality of more than two, at least 20 mol percent of the dicarboxylic acid being an unsaturated acid selected from maleic and/or fumaric acid, (b) an aliphatic aldehyde selected from the group consisting of glutaraldehyde, butyraldehyde, octanal, hydroxypivaldehyde, esters of hydroxypivaldehyde, citronellal, 3,7-dimethyl-7-hydroxy-octanal, esters of 3,7-dimethyl-7-hydroxy-octanal, β-methoxy-propionaldehyde, and β-ethoxypropionaldehyde, the proportion of the aldehyde being an amount that is approximately that which is stoichiometrically equivalent to the unsaturated acid combined in the polyester, and (c) a metal salt drier or an ultraviolet sensitizer, the drier or sensitizer serving in the presence of oxygen to convert the aldehyde to free radical form.

10. An air-drying coating composition comprising (a) a liquid polyester of a dicarboxylic acid having two to 12 carbon atoms, a diol having two to eight carbon atoms, and zero to 10 mol percent of a polyol or polyacid having a functionality of more than 2, at least 20 mol percent of the dicarboxylic acid being an unsaturated acid selected from maleic and/or fumaric acid, (b) an aliphatic aldehyde selected from the group consisting of glutaraldehyde, butyraldehyde, octanal, hydroxypivaldehyde, the acetate, propionate, hexanoate, and succinate esters of hydroxypivaldehyde, citronnellal, 3,7-dimethyl-7-hydroxy-octanal, the acetate and propionate esters of 3,7-dimethyl-7-hydroxy-octanal, 8-methoxypropionaldehyde, and β-ethoxypropionaldehyde, the proportion of the aldehyde being an amount that is approximately that which is stoichiometrically equivalent to the unsaturated acid combined in the polyester, and (c) a metal salt drier or an ultraviolet sensitizer, the drier or sensitizer serving in the presence of oxygen to convert the aldehyde to free radical form.

* * * * *